(12) United States Patent
Chen

(10) Patent No.: US 6,367,883 B1
(45) Date of Patent: Apr. 9, 2002

(54) BICYCLE WHEEL

(75) Inventor: Chao-Ying Chen, Tainan Hsien (TW)

(73) Assignee: Alex Machine Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 09/872,939

(22) Filed: Jun. 1, 2001

(30) Foreign Application Priority Data

Mar. 30, 2001 (TW) .......................................... 090204991

(51) Int. Cl.⁷ ............................ B60B 1/02; B60B 21/06; B60B 25/00; B60B 9/26
(52) U.S. Cl. ....................... 301/55; 301/58; 301/95.107; 301/104
(58) Field of Search ............................... 301/55, 57, 58, 301/59, 61, 95.101, 95.104, 95.106, 95.107, 95.108, 104

(56) References Cited

U.S. PATENT DOCUMENTS

| | | | | |
|---|---|---|---|---|
| 907,282 A | * | 12/1908 | Pugh | 301/104 |
| 1,393,797 A | * | 10/1921 | Lachman | 301/104 |
| 4,793,659 A | * | 12/1988 | Oleff et al. | 301/95.107 |
| 6,036,279 A | * | 3/2000 | Campagnolo | 301/55 |
| 6,186,598 B1 | * | 2/2001 | Chen | 301/58 |
| 6,169,638 B1 | * | 3/2001 | Mizuno et al. | 301/104 |
| 6,257,676 B1 | * | 7/2001 | Lacombe et al. | 301/58 |

* cited by examiner

*Primary Examiner*—S. Joseph Morano
*Assistant Examiner*—Jason R. Bellinger
(74) *Attorney, Agent, or Firm*—Ohlandt, Greeley, Ruggiero & Perle, L.L.P.

(57) ABSTRACT

A bicycle wheel includes a wheel rim and a plurality of spokes. The wheel rim includes spaced left and right tire retaining walls that are interconnected by a base wall. Each of the tire retaining walls is formed with a set of spoke mounting holes, each of which extends through lateral outer and inner surfaces of the tire retaining wall. Each spoke has an inner end portion mounted on a hub, and an outer end portion which includes an enlarged head abutting against the lateral outer surface of the respective tire retaining wall, an extending section received in a respective spoke mounting hole, and a bending section disposed adjacent to the lateral inner surface of the respective tire retaining wall. The bending section is bent from the extending section, and extends toward the inner end portion of the spoke.

6 Claims, 3 Drawing Sheets

BICYCLE WHEEL

BACKGROUND OF THE INVENTION

1. Field of the Invention

The present invention relates to a bicycle wheel, more particularly to a bicycle wheel with spokes that have end portions bent at a small angle to prevent breakage of the spokes.

2. Description of the Related Art

In U.S. Pat. No. 6,186,598, there is disclosed a bicycle wheel rim with an H-shaped cross-section. A plurality of hollow packing members are mounted on the wheel rim for reinforcing purposes. The packing members are formed with through holes aligned respectively with spoke mounting holes in the tire retaining walls of the wheel rim to permit installation of spokes on the wheel rim. The spokes have outer end portions mounted on the wheel rim and the packing members, and inner end portions to be mounted on a hub. The outer end portions of the spokes are generally bent by an angle greater than 90°. As such, the spokes are susceptible to breakage. The bicycle wheel thus requires a relatively large number of the spokes so as to reduce the stress applied to an individual spoke.

SUMMARY OF THE INVENTION

Therefore, the main object of the present invention is to provide a bicycle wheel with spokes that have end portions bent at a small angle to prevent breakage of the spokes.

Accordingly, the bicycle wheel of the present invention is adapted to be installed on a wheel axle, and includes a hub, a wheel rim, and a plurality of spokes. The hub is adapted to be mounted rotatably on the axle, and has left and right end portions which are opposite to each other along an axis of the axle. Each of the left and right end portions is formed with a set of spoke fastening holes which are arranged around the axis of the axle. The wheel rim is disposed around the hub. The wheel rim includes spaced-apart left and right annular tire retaining walls, each of which has a radial inner section proximate to the hub, a radial outer section distal to the hub, and an intermediate section between the radial inner and radial outer sections. The radial outer sections of the tire retaining walls are adapted for retaining a bicycle tire therebetween. The radial inner section of each of the tire retaining walls has a lateral inner surface confronting the radial inner section of another one of the tire retaining walls, and a lateral outer surface opposite to the lateral inner surface. The radial inner section of each of the tire retaining walls is formed with a set of spoke mounting holes, each of which extends through the lateral outer surface and the lateral inner surface of the radial inner section of a respective one of the tire retaining walls. The wheel rim further includes an annular base wall interconnecting the intermediate sections of the tire retaining walls. Each of the spokes has an inner end portion mounted on a respective one of the spoke fastening holes in the left and right end portions of the hub, and an outer end portion mounted on a respective one of the spoke mounting holes in the radial inner section of a respective one of the tire retaining walls. The outer end portion of each of the spokes includes an enlarged head abutting against the lateral outer surface of the radial inner section of a corresponding one of the tire retaining walls, an extending section connected to the enlarged head and received in the respective one of the spoke mounting holes, and a bending section connected to the extending section and disposed adjacent to the lateral inner surface of the radial inner section of the respective one of the tire retaining walls. The bending section is bent from the extending section, and extends from the extending section toward the inner end portion of the spoke.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
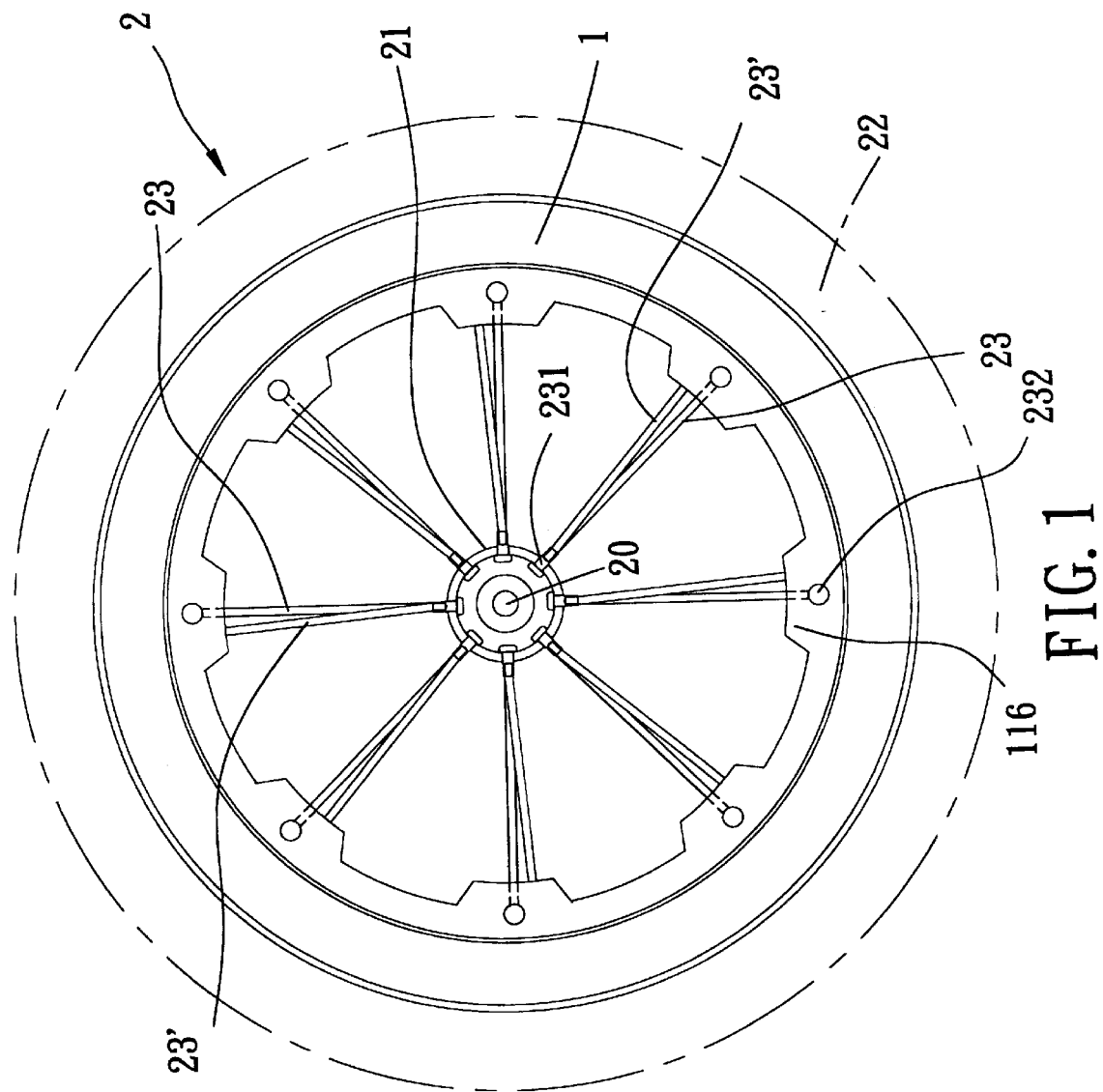
FIG. 1 is a side view illustrating a preferred embodiment of a bicycle wheel of the present invention.
Figure 2:
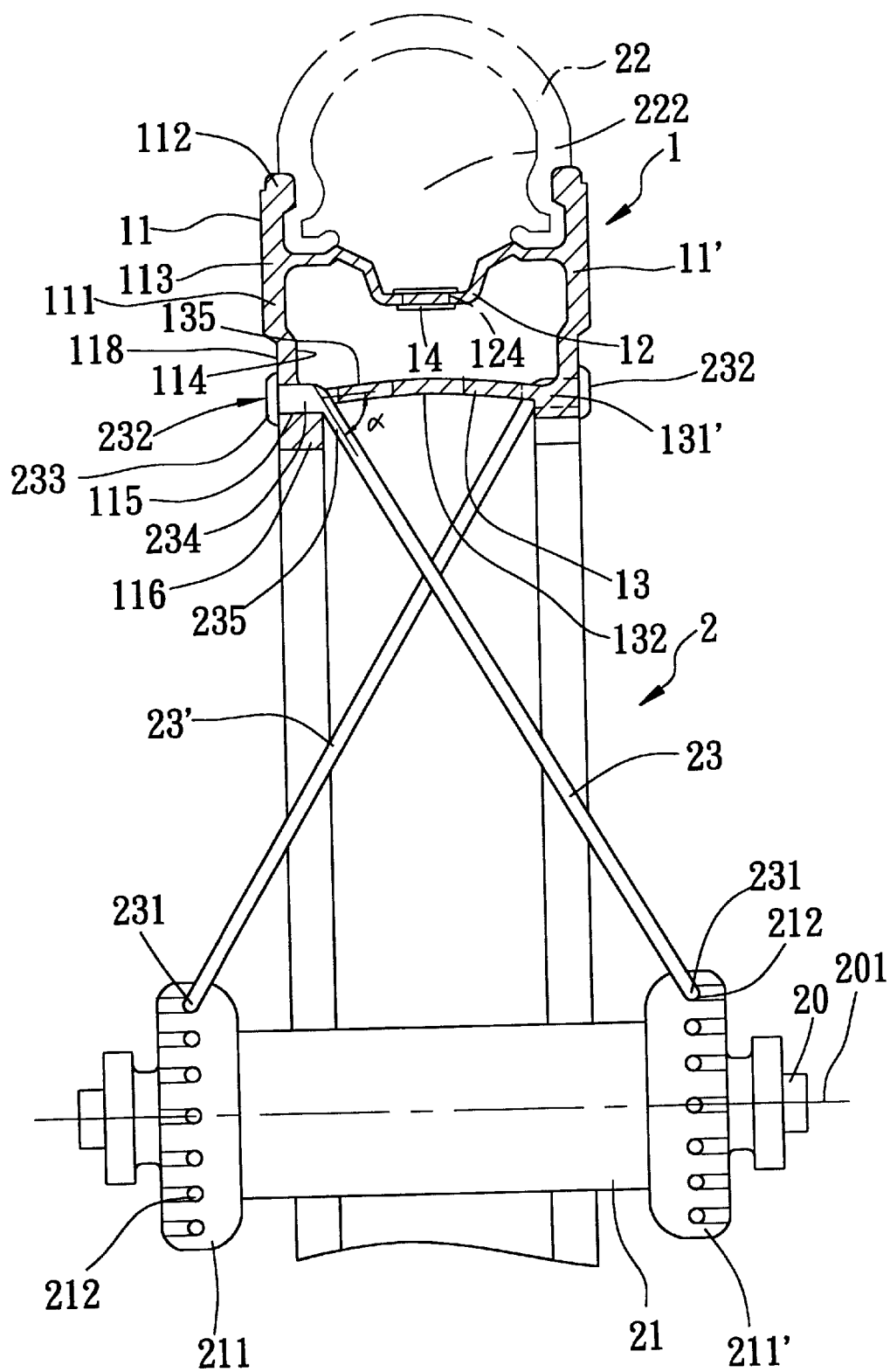
FIG. 2 is a fragmentary sectional view of the preferred embodiment.

Referring to FIGS. 1 and 2, the preferred embodiment of the bicycle wheel 2 of the present invention is adapted to be installed on a wheel axle 20, and is shown to include a hub 21 adapted to be mounted rotatably on the axle 20, a wheel rim 1 disposed around the hub 21, and a plurality of spokes 23, 23' for mounting the wheel rim 1 on the hub 21.

The hub 21 is sleeved rotatably and co-axially on the wheel axle 20, and has left and right end portions 211, 211' which are opposite to each other along an axis 201 of the axle 20. Each of the left and right end portions 211, 211' is formed with a set of spoke fastening holes 212 which are arranged around the axis 201 of the axle 20.

Figure 3:
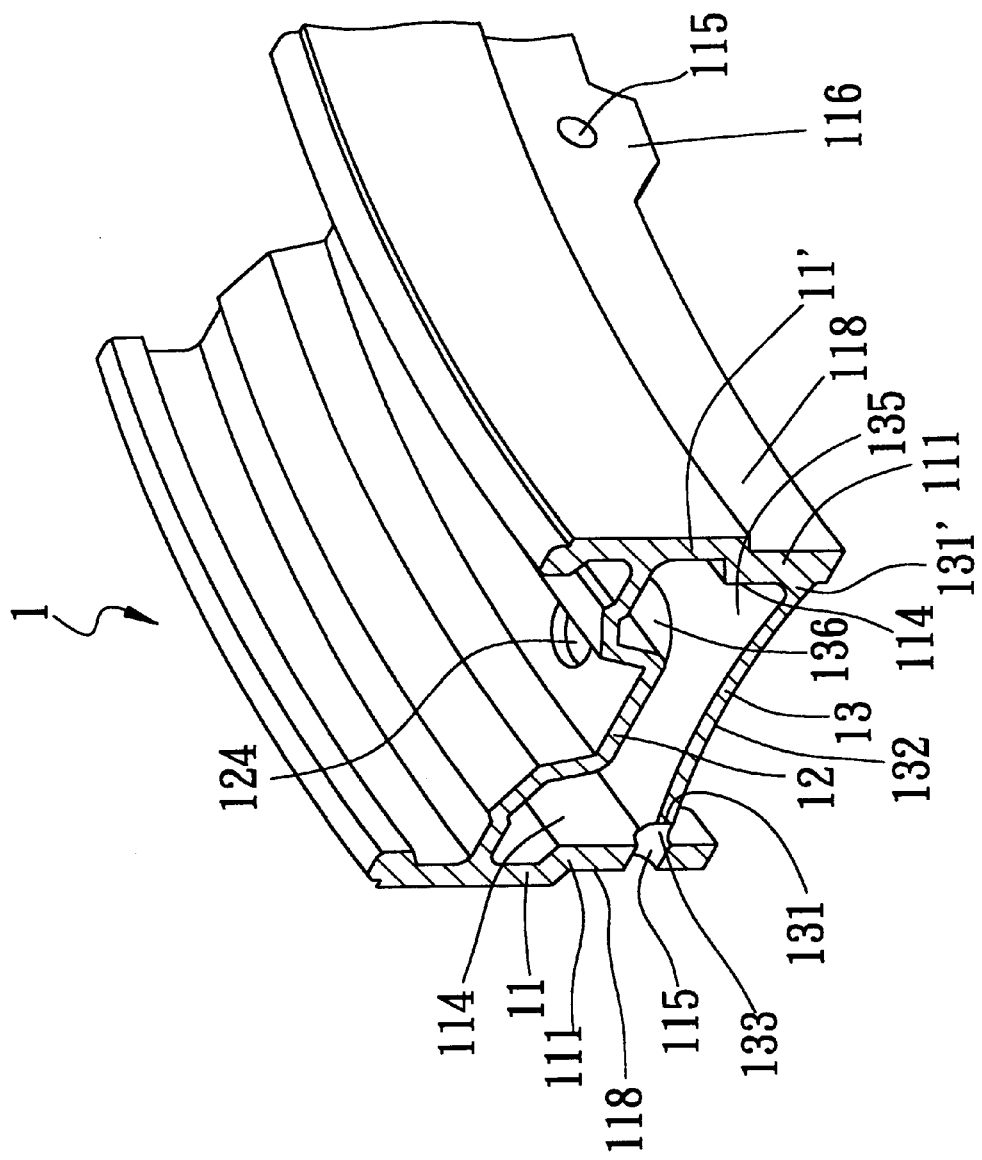
FIG. 3 is a fragmentary partly-sectioned perspective view of the preferred embodiment.

Referring to FIGS. 2 and 3, the wheel rim 1 includes an integrally formed rim body which has spaced-apart left and right annular tire retaining walls 11, 11', an annular base wall 12 and an annular connecting wall 13. Each of the left and right tire retaining walls 11, 11' has a radial inner section 111 proximate to the hub 21 and to a central point of the wheel rim 1, a radial outer section 112 distal to the hub 21 and to the central point of the wheel rim 1, and an intermediate section 113 between the radial inner and radial outer sections 111, 112. The base wall 12 interconnects the intermediate sections 113 of the left and right tire retaining walls 11, 11'. The radial outer sections 112 of the left and right tire retaining walls 11,11' are adapted for retaining a bicycle tire 22 therebetween. The radial inner section 111 of each of the tire retaining walls 11, 11' has a lateral inner surface 114 confronting the radial inner section 111 of the other one of the tire retaining walls 11, 11', and a lateral outer surface 118 opposite to the lateral inner surface 114. The radial inner section 111 of each of the tire retaining walls 11, 11' is formed with a set of spoke mounting holes 115, each of which extends through the lateral inner surface 114 and the lateral outer surface 118 of the radial inner section 111 of the respective one of the tire retaining walls 11, 11'. The connecting wall 13 interconnects the radial inner sections 111 of the left and right tire retaining walls 11, 11', and has a left terminating end 131 connected to the lateral inner surface 114 of the radial inner section 111 of the left tire retaining wall 11, and a right terminating end 131' connected to the lateral inner surface 114 of the radial inner section 111 of the right tire retaining wall 11'. The connecting wall 13 further has a radial inner surface 132 confronting the hub 21, and a radial outer surface 135 opposite to the radial inner surface 132. Each of the left and right terminating ends 131, 131' of the connecting wall 13 is formed with a set of passage holes 133, each of which is communicated with a respective one of the spoke mounting holes 115 in an adjacent one of the tire retaining walls 11, 11', and each of which is formed through the radial inner surface 132 and the radial outer surface 135 of the connecting wall 13. Each of the tire retaining walls 11, 11' has a plurality of angularly displaced reinforcing projections 116 at a radial inner edge of the tire retaining walls 11, 11'. The reinforcing projections 116 project radially and inwardly relative to the connecting wall 13 and are aligned respectively, in radial directions, with the spoke mounting holes 115 in a respective one of the tire retaining walls 11, 11'.

The bicycle tire 22 is installed on the wheel rim 1 and is retained between the radial outer sections 112 of the tire retaining walls 11, 11'. The bicycle tire 22 is in the form of an outer tire member. After the bicycle tire 22 is mounted on the wheel rim 1, an air-tight air chamber 222 is formed among the radial outer sections 112 and the bicycle tire 22. In order to mount a known valve unit 14 on the wheel rim 1 for inflating the air chamber 222, a valve mounting hole 124 is formed through the base wall 12. In addition, the connecting wall 13 is formed with an access hole 136 registered with the valve mounting hole 124 for access to the latter.

Each of the spokes 23, 23' has an inner end portion 231 mounted on a respective one the spoke fastening holes 212 in the left and right end portions 211, 211' of the hub 21, and an outer end portion 232 mounted on a respective one of the spoke mounting holes 115 in the radial inner section 111 of one of the tire retaining walls 11, 11'. As shown, a first set of the spokes 23 have their outer end portions 232 mounted on the left tire retaining wall 11 of the wheel rim 1, and have their inner end portions 231 mounted on the right end portion 211' of the hub 21. A second set of the spokes 23' have their outer end portions 232 mounted on the right tire retaining wall 11' of the wheel rim 1, and have their inner end portions 231 mounted on the left end portion 211 of the hub 21. The first set of the spokes 23 are staggered with respect to the second set of the spokes 23', as shown in FIG. 3. The outer end portion 232 of each of the spokes 23, 23' has an enlarged head 233 abutting against the lateral outer surface 118 of the radial inner section 111 of the respective one of the tire retaining walls 11, 11', an extending section 234 connected immediately to the enlarged head 233 and disposed in the respective one of the spoke mounting holes 115, and a bending section 235 connected immediately to the extending section 234 and disposed adjacent to the lateral inner surface 114 of the radial inner section 111 of the respective one of the tire retaining walls 11, 11'. The bending section 235 extends through an adjacent one of the passage holes 133 in the connecting wall 13 and through the radial inner surface 132 of the connecting wall 13. The bending section 235 extends from the extending section 234 toward the inner end portion 231 of the respective spoke 23, 23'. The bending section 235 of the outer end portion 232 of each of the spokes 23, 23' is bent from the extending section 234 by an angle smaller than 90°.

To install the spokes 23, 23' on the wheel rim 1 and the hub 21, the spokes 23, 23' are extended through the spoke mounting holes 115 in the tire retaining walls 11, 11', respectively, from lateral outer sides toward lateral inner sides of the tire retaining walls 11, 11' such that the spokes 23, 23' extend through the adjacent passage holes 133 in the connecting wall 13 and toward the hub 21 and such that the enlarged heads 233 of the spokes 23, 23' are retained at the lateral outer sides of the tire retaining walls 11, 11'. The inner end portions 231 are extended respectively through the spoke fastening holes 212 in the left and right end portions 211, 211' of the hub 21 and are fastened to the hub 21 with the use of nuts (not shown).

It has thus been shown that, since the bending section 235 of each of the spokes 23, 23' is bent from the extending section 234 by a smaller angle, which is smaller than 90°, the installation of the spokes 23, 23' to the wheel rim 1 and the hub 21 is facilitated. Moreover, the spokes 23, 23' are less susceptible to breakage, when compared with those in the aforementioned prior art. As such, a fewer number of spokes is required in the bicycle wheel of this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A bicycle wheel adapted to be installed on a wheel axle, said bicycle wheel comprising:

a hub adapted to be mounted rotatably on the axle, said hub having left and right end portions which are opposite to each other along an axis of the axle, each of said left and right end portions being formed with a set of spoke fastening holes which are arranged around the axis of the axle;

a wheel rim disposed around said hub, said wheel rim including spaced-apart left and right annular tire retaining walls, each of which has a radial inner section proximate to said hub, a radial outer section distal to said hub, and an intermediate section between said radial inner and radial outer sections, said radial outer sections of said tire retaining walls being adapted for retaining a bicycle tire therebetween, said radial inner section of each of said tire retaining walls having a lateral inner surface confronting said radial inner section of another one of said tire retaining walls, and a lateral outer surface opposite to said lateral inner surface, said radial inner section of each of said tire retaining walls being formed with a set of spoke mounting holes, each of which extends through said lateral outer surface and said lateral inner surface of said radial inner section of a respective one of said tire retaining walls, said wheel rim further including an annular base wall interconnecting said intermediate sections of said tire retaining walls; and a plurality of spokes, each of which has an inner end portion mounted on a respective one of said spoke fastening holes in one of said left and right end portions of said hub, and an outer end portion mounted on a respective one of said spoke mounting holes in said radial inner section of one of said tire retaining walls, said outer end portion of each of said spokes including an enlarged head abutting against said lateral outer surface of said radial inner section of a corresponding one of said tire retaining walls, an extending section connected to said enlarged head and received in the respective one of said spoke mounting holes, and a bending section which is connected to said extending section and which is disposed adjacent to said lateral inner surface of said radial inner section of the corresponding one of said tire retaining walls, said bending section being bent from said extending section and extending from said extending section toward said inner end portion of said spoke.

2. The bicycle wheel as claimed in claim 1, wherein said bending section of each of said spokes is bent from said extending section by an angle smaller than 90°.

3. The bicycle wheel as claimed in claim 1, wherein said wheel rim further includes an annular connecting wall interconnecting said radial inner sections of said tire retaining walls, said connecting wall having a left terminating end which is connected to said lateral inner surface of said radial inner section of said left tire retaining wall, and a right terminating end which is connected to said lateral inner surface of said radial inner section of said right tire retaining wall, said connecting wall further having a radial inner surface confronting said hub, each of said left and right terminating ends of said connecting wall being formed with a set of passage holes which are communicated respectively with said spoke mounting holes in an adjacent one of said left and right tire retaining walls and which are formed through said radial inner surface of said connecting wall, said bending section of each of said spokes extending through a respective one of said passage holes in said connecting wall.

4. The bicycle wheel as claimed in claim 3, wherein each of said tire retaining walls is formed with a plurality of reinforcing projections which project radially and inwardly relative to said connecting wall and which are aligned respectively, in radial directions, with said spoke mounting holes in a respective one of said tire retaining walls.

5. The bicycle wheel as claimed in claim 1, wherein said outer end portions of a first set of said spokes are mounted on said spoke mounting holes in said left tire retaining wall, said inner end portions of said first set of said spokes being mounted on said spoke fastening holes in said right end portion of said hub, said outer end portions of a second set of said spokes being mounted on said spoke mounting holes in said right tire retaining wall, said inner end portions of said second set of said spokes being mounted on said spoke fastening holes in said left end portion of said hub.

6. The bicycle wheel as claimed in claim 5, wherein said first set of said spokes are staggered with respect to said second set of said spokes.

* * * * *